(12) United States Patent
Hatta (10) Patent No.: US 8,186,374 B2
(45) Date of Patent: May 29, 2012

(54) FUEL CELL VALVE AND FUEL CELL SYSTEM USING THE VALVE

(75) Inventor: Kentaro Hatta, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 325 days.

(21) Appl. No.: 12/444,085

(22) PCT Filed: Mar. 18, 2008

(86) PCT No.: PCT/IB2008/000634
§ 371 (c)(1),
(2), (4) Date: Apr. 2, 2009

(87) PCT Pub. No.: WO2008/114120
PCT Pub. Date: Sep. 25, 2008

(65) Prior Publication Data
US 2010/0071781 A1 Mar. 25, 2010

(30) Foreign Application Priority Data
Mar. 22, 2007 (JP) .................... 2007-075106
Oct. 30, 2007 (JP) .................... 2007-282255

(51) Int. Cl.
*F16K 49/00* (2006.01)
(52) U.S. Cl. .......... 137/341; 251/129.17; 251/324; 251/331; 137/545; 137/550
(58) Field of Classification Search ........... 137/341, 137/545, 550; 251/129.17, 324, 331
See application file for complete search history.

(56) References Cited

U.S. PATENT DOCUMENTS

| | | | | | |
|---|---|---|---|---|---|
| 2,556,557 | A | * | 6/1951 | Schweitzer, Jr. | 137/341 |
| 3,575,199 | A | * | 4/1971 | Beattie | 137/341 |
| 3,580,267 | A | * | 5/1971 | Baker | 137/203 |
| 4,544,385 | A | * | 10/1985 | Tanaka | 96/114 |
| 5,915,410 | A | * | 6/1999 | Zajac | 137/341 |
| 5,941,271 | A | * | 8/1999 | Chovan | 137/204 |
| 6,805,152 | B2 | * | 10/2004 | Kanzaka et al. | 137/341 |
| 7,546,848 | B2 | * | 6/2009 | Koenekamp | 137/341 |
| 7,770,592 | B2 | * | 8/2010 | Knight et al. | 137/1 |
| 2004/0250855 | A1 | * | 12/2004 | Hyde et al. | 137/341 |
| 2006/0214130 | A1 | * | 9/2006 | Tanikawa et al. | 251/331 |

FOREIGN PATENT DOCUMENTS

| | | |
|---|---|---|
| EP | 1 213 451 | 6/2002 |
| FR | 2 851 315 | 8/2004 |
| JP | 2006-153177 | 6/2006 |
| WO | WO 2008/008963 | 1/2008 |

OTHER PUBLICATIONS

EPO Machine Translation of EP1213451.*

* cited by examiner

*Primary Examiner* — Craig Schneider
*Assistant Examiner* — Jessica Cahill
(74) *Attorney, Agent, or Firm* — Drinker Biddle & Reath LLP (57) ABSTRACT

A valve for a fluid passage in a vehicle fuel cell system. A housing includes an inflow passage connected to an upstream side of the fluid passage and an outflow passage connected to a downstream side of the fluid passage. A valve body is disposed in the housing and includes an intermediate fluid passage configured to provide fluid communication between the inflow passage and the outflow passage. A heating element is configured to apply heat directly to the valve body.

17 Claims, 7 Drawing Sheets

FIG. 8

FUEL CELL VALVE AND FUEL CELL SYSTEM USING THE VALVE

CROSS-REFERENCE TO RELATED APPLICATIONS

This application claims priority to Japanese Patent Application Nos. 2007-75106, filed Mar. 22, 2007, and 2007-282255, filed Oct. 30, 2007, which are incorporated by reference herein in the entirety.

BACKGROUND OF THE INVENTION

1. Field of the Invention

The present invention relates to a fuel cell valve and a fuel cell system using the fuel cell valve, and more particularly, to a fuel cell valve suitably used for a purge valve that opens and closes a passage of fluid, and a fuel cell system using the fuel cell valve.

2. Description of Related Art

In a related art fuel cell valve, a first port introducing hydrogen is provided on a side of a first valve body, and a hot-water passage through which hot water flows to heat the vicinity of the first port is provided above the first port. A recess indented upward is provided in the first valve body at a position such as to face a valve element of a valve mechanism, and ensures a predetermined clearance when the valve element is separate from a valve seat. An elastic member is mounted on a projection of a movable core of a solenoid that faces a recess of a shaft guide. The above-described structure prevents the valve element in the electromagnetic valve for exhausting reaction gas, from freezing in a low-temperature environment.

However, since it is difficult to completely remove condensed water, the valve may still freeze in a low-temperature environment, requiring time to heat and thaw the valve.

BRIEF SUMMARY OF THE INVENTION

Accordingly, it is an object of the present invention to provide a fuel cell valve that can be quickly thawed, and a fuel cell system using the valve.

In an embodiment, the invention provides a valve for a fluid passage in a vehicle fuel cell system. A housing includes an inflow passage connected to an upstream side of the fluid passage and an outflow passage connected to a downstream side of the fluid passage. A valve body is disposed in the housing and includes an intermediate fluid passage configured to provide fluid communication between the inflow passage and the outflow passage. A heating element is configured to apply heat directly to the valve body.

According to embodiments of the present invention, the valve driving unit, the valve body, and the heating element are combined thermally. The valve body is thermally insulated from the housing including the inflow passage and the outflow passage. Therefore, heat from the heating element can intensively heat and quickly thaw the valve body.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

First, a fuel cell system to which a fuel cell valve according to an embodiment of the present invention is applied will be described with reference to FIG. 1, as a system configuration view. A fuel cell system 101 includes a stack 104 serving as a solid polymer fuel cell body. The stack 104 includes an anode (fuel electrode) 102 to which fuel gas is supplied, and a cathode (oxidant electrode) 103 to which oxidant gas is supplied.

High-pressure hydrogen gas is stored as fuel gas in a hydrogen tank 105. The pressure of the high-pressure hydrogen gas supplied from the hydrogen tank 105 is reduced to an operating pressure for the fuel cell by a hydrogen pressure control valve 106, and the hydrogen gas is then supplied to the anode 102 via hydrogen supply passages 107 and 108. Part of the hydrogen gas that is not consumed in the anode 102 (anode off gas) is returned to the hydrogen supply passage 108 by a hydrogen circulation passage 110 and a hydrogen circulation pump 111, is mixed with new hydrogen supplied from the hydrogen supply passage 107, and is then supplied again to the anode 102. The hydrogen circulation passage 110 communicates with the outside via an exhaust passage 112. The exhaust passage 112 is opened and closed by a purge valve 113.

Air serving as oxidant gas is taken into a compressor 116 via an air filter (not shown). The compressor 116 supplies compressed air to the cathode 103 via an air supply passage 117. After oxidant gas is partly used for reaction in the cathode 103, the remaining part of the air is exhausted from an air exhaust passage 119. An air pressure control valve 120 for controlling the air pressure in the cathode 103 is provided in the air exhaust passage 119. Although not shown, the fuel cell system 101 also includes a cooling system that keeps the stack 104 at the optimum temperature.

A hydrogen pressure sensor 109 measures the pressure in the hydrogen supply passage 108. A temperature sensor 114 measures the temperature of gas in the hydrogen circulation passage 110. A temperature sensor 115 measures the temperature of the purge valve 113. A pressure sensor 118 measures the pressure in the air supply passage 117. Values measured by these sensors 109, 114, 115, and 118 are sent to a control unit 123. The control unit 123 is connected to an outside-air temperature sensor 121 that measures the temperature of outside air, and to a calendar clock 122 that holds the present time and date. According to signals measured by the sensors, the control unit 123 controls the hydrogen pressure control valve 106, the hydrogen circulation pump 111, the purge valve 113, the compressor 116, and the air pressure control valve 120, and thereby controls the overall operation of the fuel cell system 101.

The stack 104 generates power by causing an electrochemical reaction between hydrogen supplied to the anode 102 and oxygen in the air supplied to the cathode 103. Unreacted hydrogen gas exhausted from the stack 104 is sucked by the hydrogen circulation pump 111, and returns to the stack 104 through the hydrogen circulation passage 110. Unreacted gas discharged from the stack 104, and water generated by a chemical reaction, are exhausted outside through the opened purge valve 113 and the exhaust passage 112.

The control unit 123 is preferably formed by a microprocessor including a CPU, a program ROM, a working RAM, and an input/output interface. The control unit 123 reads signals from the sensors provided in the fuel cell system 101, and issues commands to the components according to pre-stored control logic so as to control the fuel cell system 101.

For example, the temperature sensor 114 detects the temperature in the hydrogen circulation passage 110, and inputs the detected value to the control unit 123. The hydrogen pressure sensor 109 detects the pressure of hydrogen in the stack 104, and inputs the detected value to the control unit 123. The control unit 123 controls the hydrogen pressure control valve 106 and the recirculation pump on the basis of the detected values of the hydrogen pressure sensor 109 and the temperature sensor 114.

Similarly, the air pressure sensor 118 detects the pressure of air in the cathode 103, and inputs the detected value to the control unit 123. The control unit 123 controls the air pressure control valve 120 and the compressor 116 on the basis of the detected value of the air pressure sensor 118.

A fuel cell valve used as the purge valve 113 in FIG. 1 will now be described in detail with reference to FIG. 2. FIG. 2 is a cross-sectional view of a fuel cell valve of a solenoid type. The fuel cell valve includes valve bodies 7 and 18, filters 9 and 10 for removing foreign material from the fluid, a valve element 6, valve seat 33, a valve driving unit 60 that drives the valve element 6 by an electromagnetic force, a housing 12 having an inflow passage 13 and an outflow passage 14, and a diaphragm 5. More specifically, the interior of the valve body 18 includes a first space serving as a high-pressure chamber 19 which is connected to the inflow passage 13, and the interior of the valve body 7 includes a second space serving as a low-pressure chamber 20 that is connected to the outflow passage 14. The valve bodies 7 and 18, filters 9 and 10, a flow-rate regulating orifice (hereinafter referred to as an orifice) 8 having a projection 61 projecting into the fluid passage so as to regulate the flow rate of the fluid, and a heater 11 serving as a heat generator, are combined into one unit.

Referring to FIG. 2, the valve driving unit 60 for driving the valve element 6 by an electromagnetic force includes a coil 1, an attractor 2, a needle 3, and a coil spring 4. The attractor 2 and the needle 3 are formed of a magnetic metal material, and are provided in the coil 1. The coil spring 4 biases the needle 3 downward and away from the attractor 2. In a closed valve state, the coil spring 4 acts in the stretching direction, the needle 3 is pushed downward, and the valve element 6 provided at the lower end of the needle 3 is brought into contact with the valve seat 33.

When power is supplied to the coil 1, the attractor 2 becomes magnetized and attracts the needle 3, causing the needle 3 and the valve element 6 to move upward together. Consequently, the valve element 6 separates from the valve seat 33 so as to bring about an open valve state, and the inflow passage 13 and outflow passage 14 fluidly communicate with each other. A portion in which the needle 3 moves is insulated by the diaphragm 5 from the low-pressure chamber 20 through which the fluid passes. The diaphragm 5 and the valve element 6 are preferably integrally molded from, for example, unvulcanized rubber or silicone rubber.

The housing 12 has a substantially cylindrical space that stores a valve body assembly composed of the low-pressure chamber valve body 7 and the high-pressure chamber valve body 18. This space is connected to the inflow passage 13 into which the fluid flows in and the outflow passage 14 from which the fluid flows out.

An internal thread portion 35 provided in the low-pressure chamber valve body 7 and a complementary external thread portion 36 provided in the high-pressure chamber valve body 18 are screwed together, so that the low-pressure chamber valve body 7 and the high-pressure chamber valve body 18 are connected. The orifice 8 is provided between the high-pressure chamber valve body 18 and the valve element 6. As shown in FIG. 2, the orifice 8 can be unitarily formed with the external thread portion 36.

Below the orifice 8, an upstream filter 9 shaped like a metal mesh plate and configured to remove foreign substances is attached to the high-pressure chamber valve body 18, for example, by welding. In this case, the upstream filter 9 may be provided downstream of the orifice 8 as long as it is provided upstream of the valve element 6. Around the low-pressure chamber valve body 7, a downstream filter 10 shaped like a metal mesh cylinder and configured to remove foreign substances is provided, and is attached at both ends to the low-pressure chamber valve body 7, for example, by welding. The mesh size of the filters 9 and 10 is set to be smaller than the assumed minimum size of foreign substances. Further, the surface areas of the filters 9 and 10 are configured so that fluid communication between the inflow passage 13 and outflow passage 14 is not disturbed by clogging even when all foreign substances produced during the assumed service period, or during the total operating time serving as the life of the fuel cell system 101, adhere to the filters 9 and 10. This configuration eliminates the necessity of cleaning or replacing the filters 9 and 10 during the service period.

Both the high-pressure chamber valve body 18 and the low-pressure chamber valve body 7 are formed of metal and have a plurality of horizontal holes 34 and 37 through which the fluid passes. Therefore, the upstream filter 9, the downstream filter 10, the orifice 8, and the valve element 6, where water easily accumulates are connected by metal contact.

A vertical passage 32 is provided in the low-pressure chamber valve body 7, and communicates with the low-pressure chamber 20 in an open valve state. By subjecting the surfaces of the passages 13 and 14 in the high-pressure chamber valve body 18 and the low-pressure chamber valve body 7 to water repellant finishing or hydrophobic finishing, water entering the fuel cell valve can be discharged into the passage 13 or the passage 14. This can reduce the amount of water accumulating in the fuel cell valve.

A sliding portion of the needle 3 is disposed apart from the heater 11, and heat from the heater 11 is not easily transmitted to the sliding portion. As a result, the sliding portion should be insulated from the fluid passage by the diaphragm 5 so that condensed water is not produced or collected therein.

In a lower part of the high-pressure chamber valve body 18, an internal thread portion 38 is provided, and is screwed on an external thread portion 39 of the electrical heater 11. A heater feeder cable 40 is connected to the heater 11. Power is supplied from the control unit 123 to the heater 11 when freezing during a non-operation state is predicted, or when unfreezing is needed at the start of operation. The heater 11 is preferably a temperature self-controlled heater, such as a PTC (positive temperature coefficient thermistor) heater. In this case, overheating of the fuel cell valve can be prevented without providing a temperature detecting device and a heater control device based on the detected temperature.

Bolt holes 62 are provided in a top face of the housing 12, and a flange-shaped portion 63 of the low-pressure chamber valve body 7 is fastened to the housing 12 by bolts 31. An O-ring 17 is provided between the low-pressure chamber valve body 7 and the housing 12 so as to maintain a seal between the valve downstream section and the outside. An O-ring 16 is provided between the high-pressure chamber valve body 18 and the space in the housing 12 so as to maintain a seal between the outside and the valve upstream section. Further, an O-ring 15 is provided between the high-pressure chamber valve body 18 and the space in the housing 12 so as to maintain a seal between the valve upstream section and the valve downstream section. The passages 13 and 14 provided in the housing 12 slope downward with respect to the fuel cell valve.

In the above-described configuration, the fuel cell valve can work even when the fluid flow direction is reversed. More specifically, the fluid may be introduced from the passage 14, and may be exhausted from the passage 13. In this case, the pressure in the high-pressure chamber 19 is low, and the pressure in the low-pressure chamber 20 is high.

In the first exemplary embodiment, the valve bodies 7 and 18 having the heater 11 are fixed separately from the housing 12 and configured to be in thermal communication. This allows the heater 11 to efficiently transmit heat to the valve bodies 7 and 18 without the heat escaping to the housing 12. Therefore, the passage 32 having the smallest diameter in the valve and the contact portion between the valve element 6 and the valve seat 33 can be thawed quickly.

The passage 32 vertically extends, and the heater 11 is provided below the passage 32 in the direction of gravity. Consequently, water remaining in the passage 32 and condensed water drop down when the vehicle stops, and are collected near the heater 11. Since the water is collected near the heater 11, the thawing time of the entire valve can be reduced. While the passage 32 vertically extends in the first exemplary embodiment shown in FIG. 1, it may extend at an angle to the vertical direction as long as the angle allows water to be collected near the heater 11.

The inflow passage 13 in the high-pressure chamber 19 and the outflow passage 14 in the low-pressure chamber 20 are provided in the housing 12 in a manner such as to slope downward in the direction of gravity from portions adjacent to the valve bodies 7 and 18. More specifically, the passage 13 slopes downward from the lower end of the high-pressure chamber 19 (first space) in the valve body 18, and the passage 14 slopes downward from the lower end of the low-pressure chamber 20 (second space) in the valve body 7. Egress of condensed water and the like out of the valve is promoted by gravity. Therefore, the number of frozen portions can be reduced, and the thawing time can be shortened.

Since the heater 11 is disposed on the side of the high-pressure chamber 19, water contained in gas flowing from the high-pressure chamber 19 to the low-pressure chamber 20 can be positively removed and collected near the heater 11. Since the water can be collected near the heater where the temperature is highest, the thawing time for the entire valve can be shortened.

Since the valve bodies 7 and 18 are in contact with the housing 12 with the O-rings 15 and 16 disposed therebetween, heat escaping from the heater 11 to the housing 12 can be reduced further.

The downstream filter 10 suppresses emission of heat transmitted to the contact portion between the valve element 6 and the valve seat 33 to the outer periphery. Therefore, the thawing time can be reduced further.

The upstream filter 9 is connected to a lower part of the passage 32 in the direction of gravity. This allows the passage 32 to be warmed up from the lower side while removing the foreign material. Therefore, the thawing time can be reduced further.

Since the orifice 8 is disposed in the passage 32, heat can be transmitted to the radial center of the passage 32 while regulating the flow rate. Therefore, the thawing time can be reduced further.

In the fuel cell valve according to the first exemplary embodiment, even when the vehicle is left for a long time below the freezing point and water is frozen in the fuel cell valve, heat from the heater 11 can be effectively transmitted to the upstream filter 9, the downstream filter 10, the orifice 8, and the valve element 6, where water easily accumulates. For this reason, ice can be melted in a short period with less power consumption. Therefore, it is possible to quickly exhaust unreacted gas discharged from the stack 104 and water generated by reaction.

Figure 1:
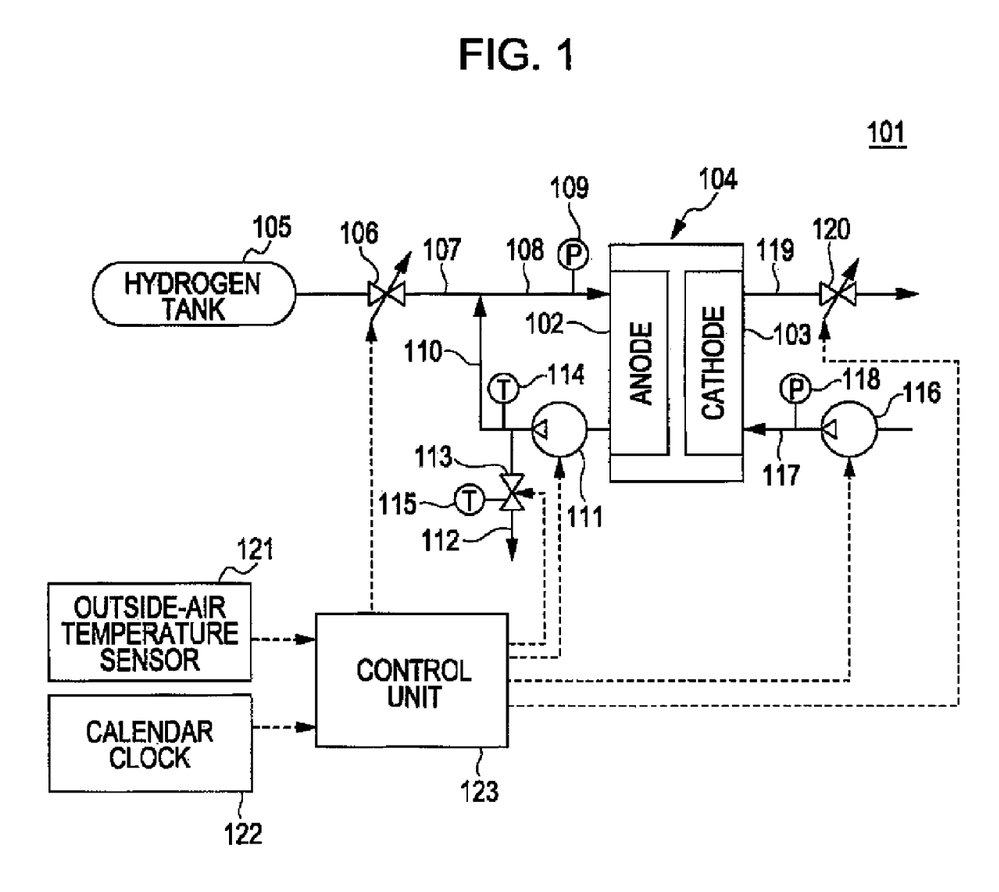
FIG. 1 is a schematic view explaining a fuel cell system to which a fuel cell valve according to an embodiment of the present invention is applied.
Figure 2:
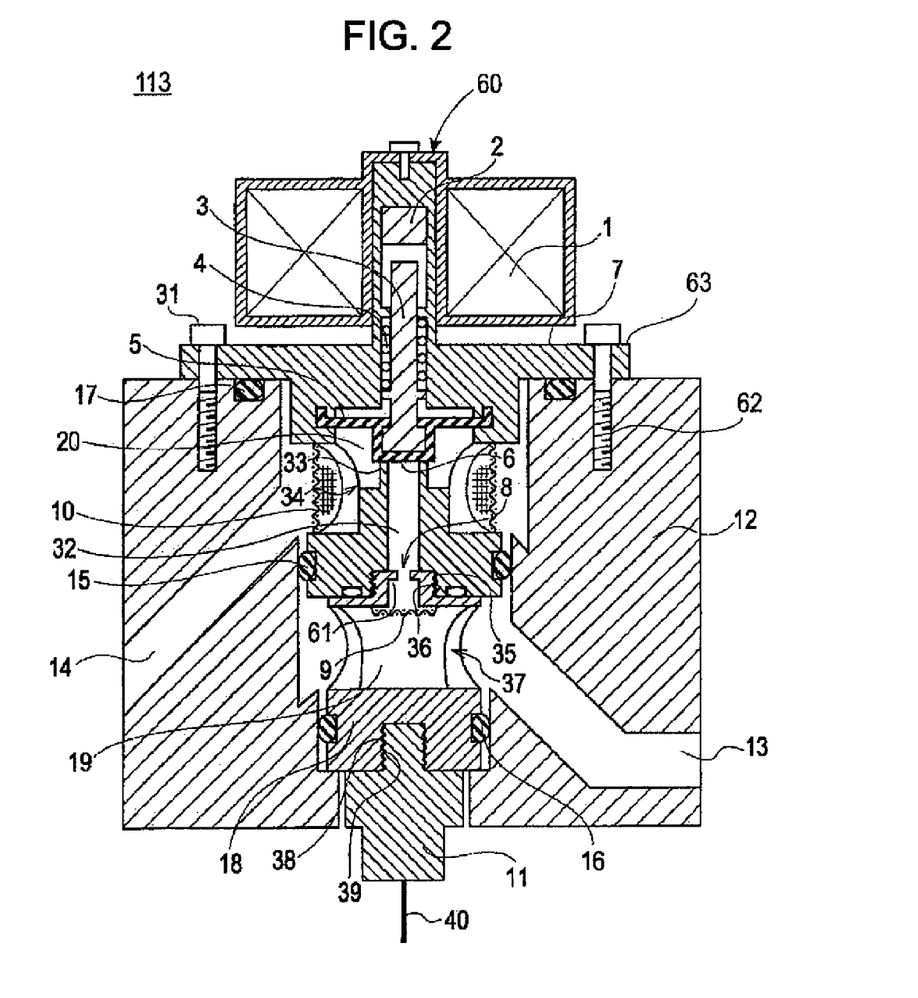
FIG. 2 is a cross-sectional view of a fuel cell valve according to a first exemplary embodiment of the present invention.

The fuel cell valve according to the first exemplary embodiment can be used not only as the purge valve 113 shown in FIG. 1, but also as a fluid exhaust valve or a fluid switching valve placed at any position in the fuel cell system 101, such as valves 106 and 120 for example.

Figure 3:
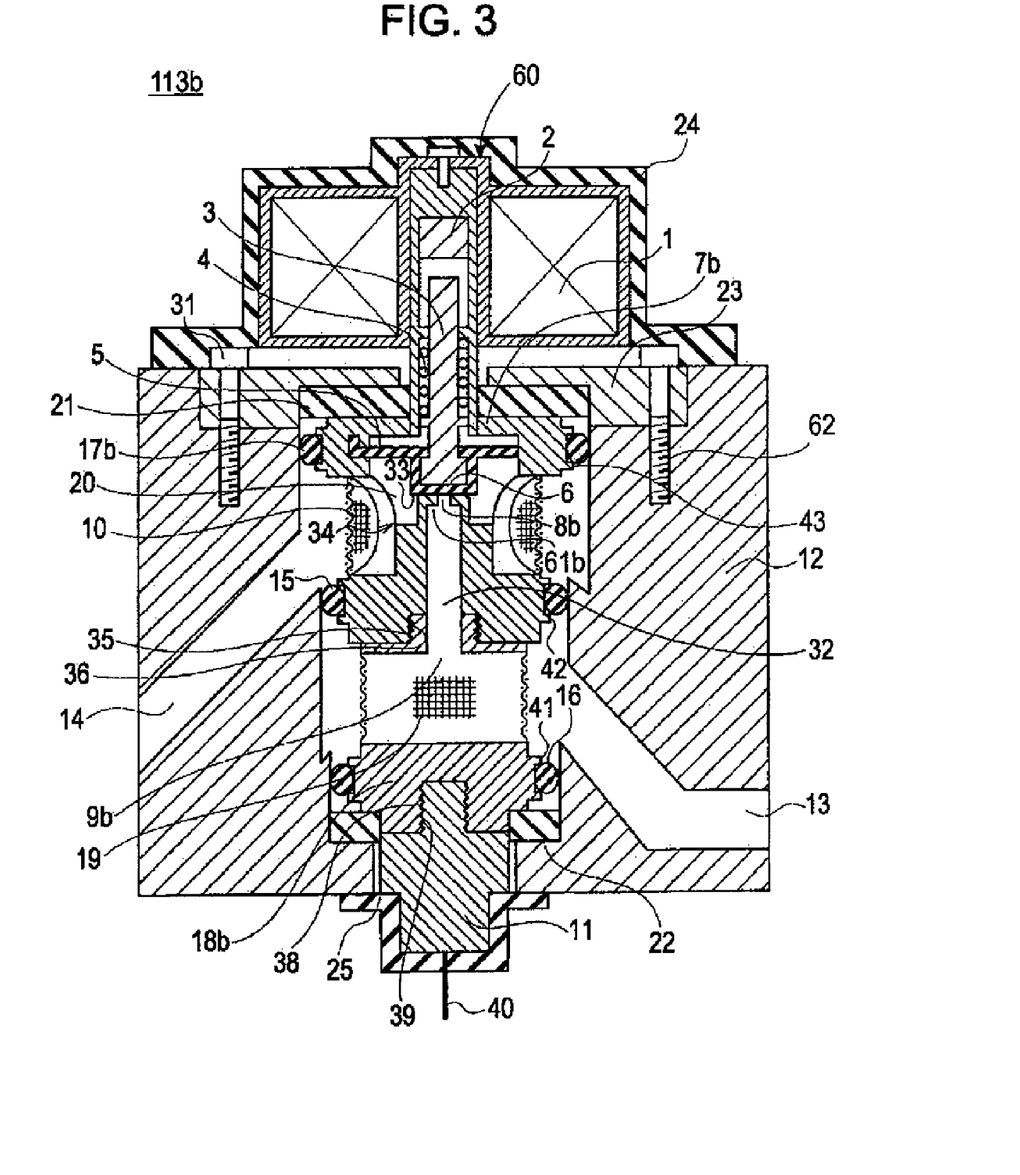
FIG. 3 is a cross-sectional view of a fuel cell valve according to a second exemplary embodiment of the present invention.

FIG. 3 is a cross-sectional view of a fuel cell valve according to a second exemplary embodiment of the present invention. The fuel cell valve according to the second exemplary embodiment is applied to a fuel cell system similar to the fuel cell system according to the first exemplary embodiment shown in FIG. 1. The second exemplary embodiment is characterized in that heat-insulating elastic materials 21 and 22 are fixed between valve bodies and a housing, and in that a low-pressure chamber valve body 7b is provided separately from a cover 23.

The heat-insulating elastic materials 21 and 22 are provided at the top and bottom of a fastened assembly of the low-pressure chamber valve body 7b and a high-pressure chamber valve body 18b so that the fastened assembly is not in direct contact with a housing 12. The elastic materials 21 and 22 are each formed from, for example, a rubber sheet. The metal cover 23 is provided on the upper side of the low-pressure chamber valve body 7b, the elastic material 21 is placed between the cover 23 and the low-pressure chamber valve body 7b, and these components are fastened by bolts 31. Therefore, there is no metal contact between the housing 12 and the low-pressure chamber valve body 7b or the high-pressure chamber valve body 18b, and thermal conductivity and vibration transmissibility between the valve bodies 7b and 18b and the housing 12 can be made lower than in the first exemplary embodiment.

Acoustic vibration generated by the fuel cell valve will now be described. In a typical electromagnetic valve, acoustic vibration generated when the valve is closed is greater than when the valve is opened. This is because the valve body, the housing, or both the valve body and the housing, are vibrated by an exciting force produced when a valve element 6 collides with a valve seat 33 to close the valve. As long as the shape of the valve or the characteristics of a coil spring 4 and a diaphragm 5, are set so that an attractor 2 and a needle 3 do not collide when the valve is opened, acoustic vibration generated when opening the valve is negligibly weak in contrast to acoustic vibration generated when closing the valve. Therefore, countermeasures are mainly taken against acoustic vibration generated by closing the fuel cell valve.

In the second exemplary embodiment, the elastic materials 21 and 22 are provided between the low-pressure chamber valve body 7b and the high-pressure chamber valve body 18b, and the housing 12. Therefore, it can be considered that the valve assembly formed by combining the low-pressure chamber valve body 7b and the high-pressure chamber valve body 18b is vibrated by an exciting force produced by a collision of the valve element 6 with the valve seat 33 when the valve is closed.

Figure 7:
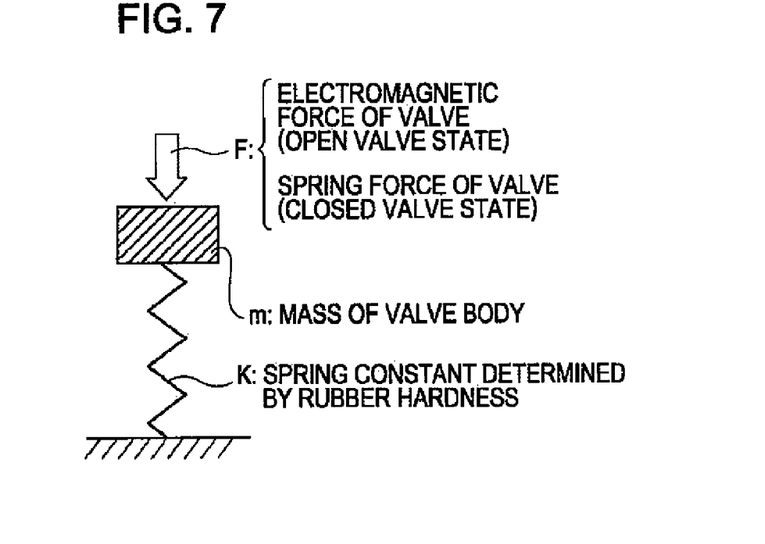
FIG. 7 is an explanatory view showing a vibration model of a valve body.

Accordingly, the natural angular frequency ω0 of the valve assembly is given by the following expression:

$$\omega 0 = \sqrt{k/m}$$

where m represents the valve assembly mass serving as the sum of the mass of the low-pressure chamber valve body 7b and the mass of the high-pressure chamber valve body 18b, and k represents the spring constant determined by the rubber hardness of the elastic members 21 and 22, as shown in FIG. 7.

In order to avoid harsh acoustic waves from being produced by an exciting force when the valve is closed, the rubber hardness of the elastic materials 21 and 22 is set to provide the spring constant k such that the frequency obtained by multiplying the natural angular frequency ω0 by $\sqrt{2}$ is less than or equal to the lower limit (16 to 20 Hz) of the audible frequency. This relationship is given by the following Expression (1):

$$1/((\sqrt{2})\pi) \times \sqrt{(k/m)} \leq 16 \tag{1}$$

Figure 8:
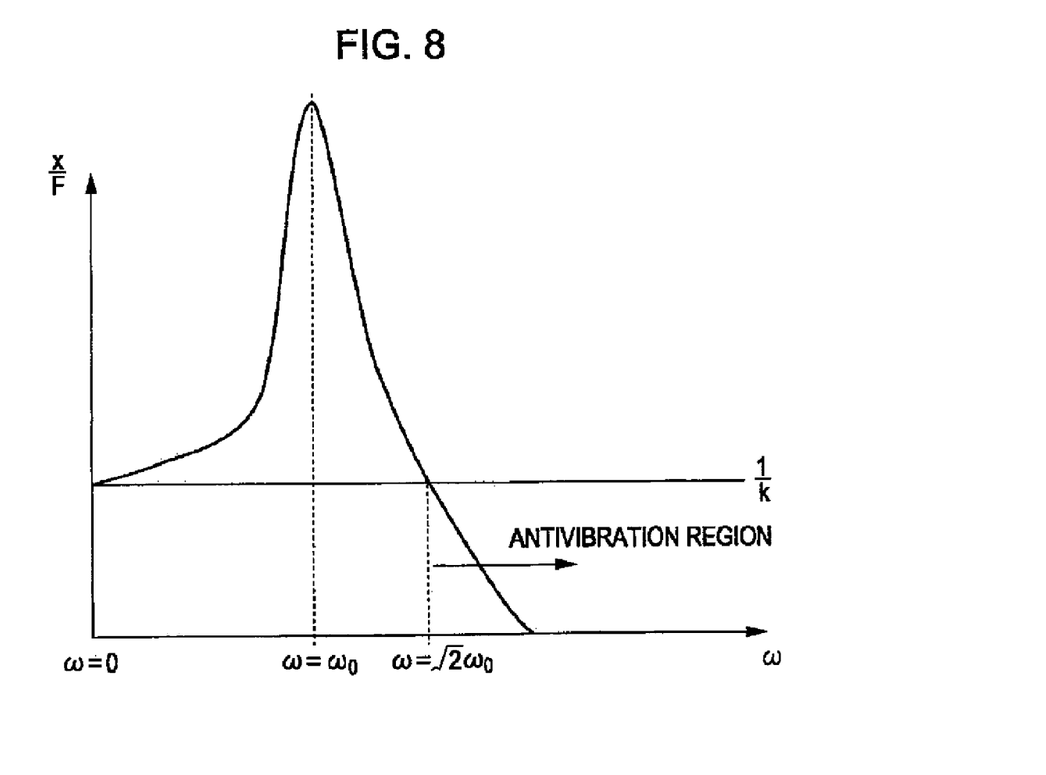
FIG. 8 is a graph showing an example of a vibration characteristic of the valve body.

Thus, the audible frequency range serves as an antivibration region, as shown in FIG. 8, and acoustic vibration of the fuel cell valve is suppressed. Therefore, it is possible to prevent vibration and impacts caused by closing the valve from being transmitted from the housing 12 to the vehicle while regulating the up-down movement of the high-pressure chamber valve body 7b and the low-pressure chamber valve body 18b relative to the housing 12.

In the second exemplary embodiment, O-ring holding portions 41, 42, and 43 of the high-pressure chamber valve body 7b and the low-pressure chamber valve body 18b, for holding O-rings 16, 15, and 17b, are larger in diameter than the outer peripheries of the valve bodies. By thus increasing the diameter of the O-ring holding portions 41, 42, and 43 of the valve bodies, a larger clearance can be formed between the high-pressure chamber valve body 18b and the low-pressure chamber valve body 7b, and the housing 12, while maintaining a seal between the high-pressure chamber 19 and the low-pressure chamber 20 with respect to the outside. Since there is a larger clearance, heat transfer from the high-pressure chamber valve body 18b and the low-pressure chamber valve body 7b to the housing 12 can be suppressed, and the high-pressure chamber valve body 18b and the low-pressure chamber valve body 7b can be effectively heated, and the heat thereof can be retained.

The high-pressure chamber valve body 18b is shaped by clamping a cylindrical filter 9b between metal blocks from above and below and connecting the filter 9b and the metal blocks by, for example, welding. The use of the cylindrical filter 9b can make the surface area larger than when the plate-shaped filter 9 is used, as in the first exemplary embodiment. Since the cylindrical filter 9b extends vertically, water falls by its own weight. For this reason, it is possible to ensure an area that is not blocked by freezing even, when water stays in the filter 9b.

An orifice 8b is provided integrally with the valve seat 33 in the low-pressure chamber valve body 7b. More specifically, the orifice 8b is disposed at a portion with which the valve element 6 comes into contact when the valve is closed. The high-pressure chamber valve body 18b is hollow, and does not have horizontal passages, unlike the high-pressure chamber valve body 18 in the first exemplary embodiment. With this structure, since water flowing from the upstream passage 13 does not easily flow downstream of the orifice 8b, only a small amount of water flows into the low-pressure chamber 20. The water flowing in the low-pressure chamber 20 is discharged through the downstream passage 14, and water does not accumulate downstream of the orifice 8b.

After the operation of the fuel cell system 101 is stopped, part of the water that flows from the upstream passage 13 and does not flow into the low-pressure chamber 20 drops and flows into the passage 13 by its own weight. Therefore, water mainly remains in the orifice 8b and the filters 9b and 10 in the valve. By adding a linear metal material, such as a weld bead, extending vertically on the surface of the upstream filter 9b over the upper and lower blocks of the filter 9b, the area of the region where heat from the lower heater 11 passes can be increased. By connecting the high-pressure chamber valve body 7b and the low-pressure chamber valve body 18b with the same contact area and without any clearance therebetween, the area of the region where heat from the lower heater 11 passes can be increased. Further, heat from the heater 11 can be transmitted from below and from the side to frozen fluid in a frozen portion below the passage 32.

In the second exemplary embodiment, heat insulators 24 and 25 formed of, for example, foamed rubber are provided at the top and bottom of the housing 12. Since this can prevent heat of the heater 11 from dissipating from the fuel cell valve, it is possible to reduce the heat-up time of the heater and to increase the heat retaining time.

In order to efficiently transmit heat from the heater 11 to a frozen portion, it is preferable to mount the fuel cell valve in the vehicle so that the heater 11 is disposed at the lowermost position in the direction of gravity. Water remaining in the valve can thereby be collected in the lower part of the passage 32 so that the frozen portion is provided near the heater 11. Of course, the fuel cell valve can work while the passage 13 and the passage 14 are reversed and the high-pressure chamber 19 and the low-pressure chamber 20 are reversed.

By providing the above-described configuration, heat from the heater 11 and the high-pressure chamber valve body 18b can be effectively transmitted to the low-pressure chamber valve body 7b without escaping to the housing 12. Therefore, the metal mesh filters 9b and 10, the valve element 6, and the orifice 8b, that easily freeze, can be thawed in a short period, and unreacted gas from the fuel cell stack 104 and water generated by reaction can be exhausted.

The fuel cell valve according to the second exemplary embodiment can be used not only as the purge valve 113 shown in FIG. 1, but also as a fluid exhaust valve or a fluid switching valve placed at any position in the fuel cell system 101.

A third exemplary embodiment of the present invention will now be described with reference to FIGS. 4 to 6 serving as control flowcharts. The third exemplary embodiment provides a fuel cell system 101 using the fuel cell valve according to the above-described first or second exemplary embodiment. The configuration of the fuel cell system is similar to that of the fuel cell system 101 shown in FIG. 1.

Figure 4:
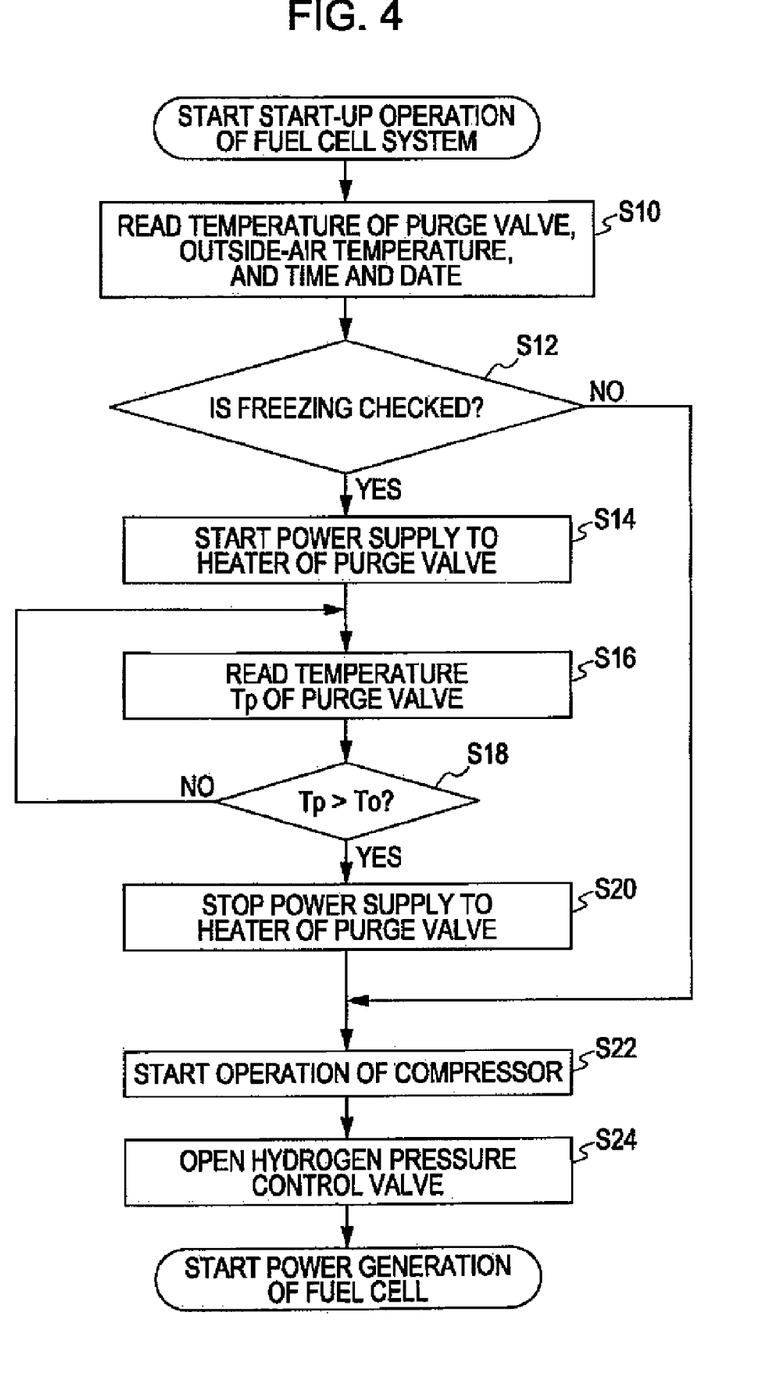
FIG. 4 is a flowchart showing control executed when the fuel cell system starts.

FIG. 4 is a flowchart showing a start-up operation of a control unit 123 in the fuel cell system 101 in the third exemplary embodiment. First, in Step S10, the control unit 123 reads the temperature of a purge valve 113 from a temperature sensor 115, reads the outside-air temperature from an outside-air temperature sensor 121, and reads the present time and date from a calendar clock 122.

In Step S12, the control unit 123 checks for freezing. For example, when the temperature of the purge valve 113 is less than 1° C. or the outside-air temperature is less than 1° C., the control unit 123 determines that freezing has occurred, and determines in other cases that freezing has not occurred. When it is determined in Step S12 that freezing has occurred, Step S14 is performed. When it is determined in Step S12 that freezing has not occurred, Step S22 is performed.

As will be described below with reference to FIG. 6, the temperature of the purge valve 113 and the outside-air temperature may be measured at regular time intervals while the operation of the fuel cell system 101 is stopped, the measured temperatures may be stored in a temperature history memory, and checking for freezing may be performed with reference to the temperature history memory on start-up of the fuel cell system 101.

In Step S14, the control unit 123 starts power supply to a heater of the purge valve 113. In Step S16, the control unit 123 reads the temperature Tp of the purge valve 113 from the temperature sensor 115, and determines in Step S18 whether the temperature Tp is more than a predetermined temperature T0 (e.g., 2° C.) at which thawing can be assumed as having been completed. If not so in Step S18, then Step S16 is performed again. If so in Step S18, then Step S20 is performed.

In Step S20, the control unit 123 stops power supply to the purge valve 113. The control unit 123 starts the operation of a compressor 116 for supplying air to a stack 104 in Step S22, and starts supply of hydrogen to the stack 104 by opening a hydrogen pressure control valve 106 in Step S24. Thus, power generation of the fuel cell is started.

During power generation of the fuel cell system 101 shown in FIG. 1, unreacted hydrogen and water produced by reaction are discharged from the stack 104 to a hydrogen circulation passage 110. In the hydrogen circulation passage 110, nitrogen leaking from a cathode 103 to an anode 102 accumulates, the hydrogen partial pressure decreases, and generated water accumulates. Therefore, the purge valve 113 is intermittently opened to discharge the water from an exhaust passage 112. For this reason, water remains in the purge valve 113.

While the operation of the fuel cell system 101 is stopped, the purge valve 113 is opened for a predetermined time, and simultaneously, a hydrogen circulation pump 111 is rotated, as will be described below. Consequently, the pressure upstream of the purge valve 113 increases, and water remaining in the purge valve 113 is exhausted from the exhaust passage 112. This operation can reduce the water that easily freezes in the purge valve 113.

By energizing the heater 11 for a predetermined time while the operation of the fuel cell system 101 is stopped, the temperatures of the valve element 6, the orifice 8, and the filters 9 and 10 in the purge valve 113 can be increased in a short time. For this reason, after the hydrogen circulation pump 111 stops and the purge valve 113 is put in a closed valve state, vapor in the hydrogen circulation passage 110 condenses from outside the purge valve 113, and condensed water does not remain in the purge valve 113.

Figure 5:
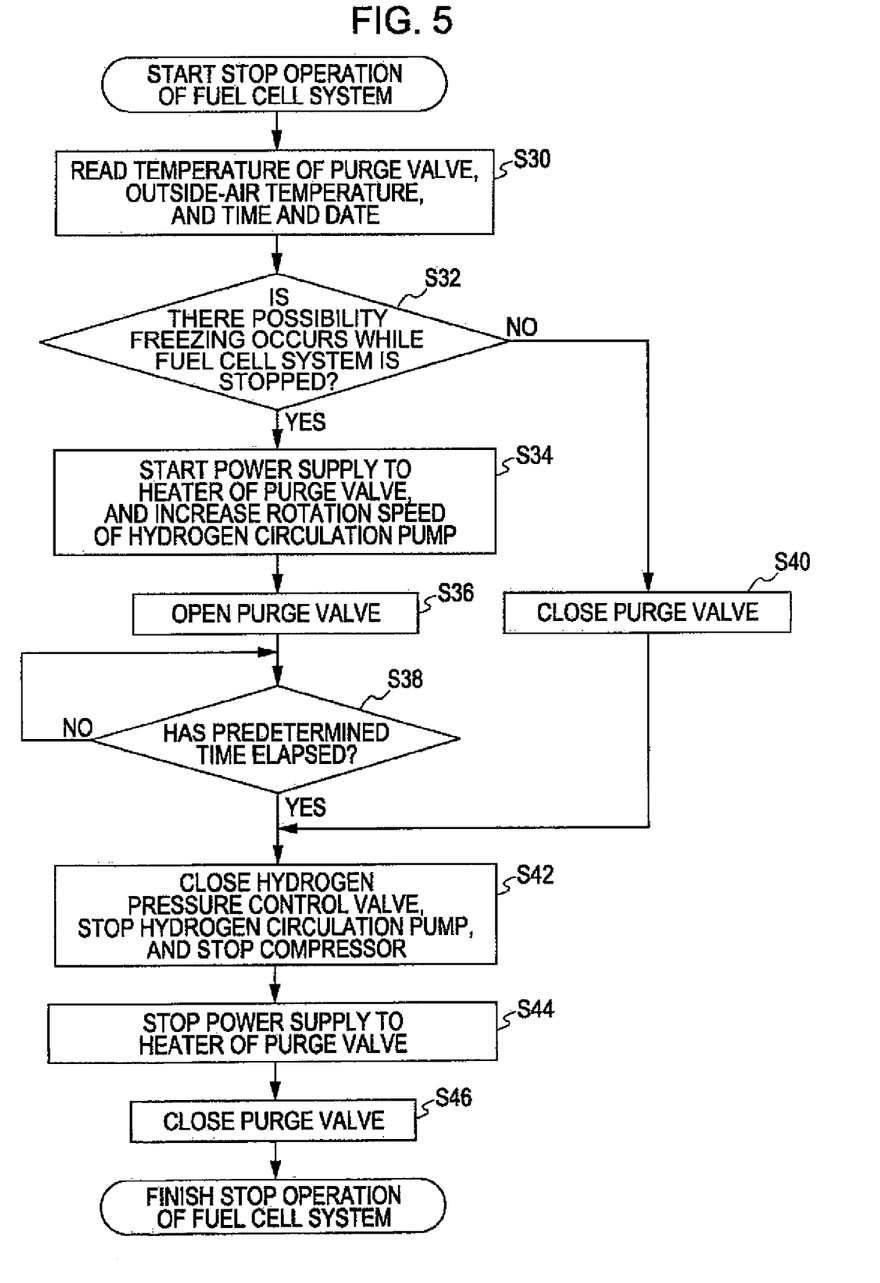
FIG. 5 is a flowchart showing control executed when the operation of the fuel cell system is stopped.

FIG. 5 is a flowchart showing a stop operation of the control unit 123 in the fuel cell system 101 according to the third exemplary embodiment. First, in Step S30, the control unit 123 reads the temperature of the purge valve 113 from the temperature sensor 115, reads the outside-air temperature from the outside-air temperature sensor 121, and reads the present time and date from the calendar clock 122.

In Step S32, the control unit 123 checks the possibility that freezing will occur while operation of the fuel cell system 101 is stopped. This check is made with reference to a combination of the present time and date and the outside-air temperature. For example, the control unit 123 determines that freezing may occur when the outside-air temperature is less than 5° C. in winter, and determines in other cases that freezing will not occur. When it is determined in Step S32 that freezing may occur, Step S34 is performed. When it is determined in Step S32 that freezing will not occur, the control unit 123 closes the purge valve 113 in Step S40, and performs Step S42. In this case in which there is no possibility that freezing will occur while the fuel cell system 101 is stopped, power is not supplied to the heater 11 of the purge valve 113, and the rotation speed of the hydrogen circulation pump 111 is not increased. Therefore, power saving can be achieved.

In Step S34, the control unit 123 starts supplying power to the heater 11 of the purge valve 113, and increases the rotation speed of the hydrogen circulation pump 111 so as to increase the pressure upstream of the purge valve 113. Then, the control unit 123 opens the purge valve 113 in Step S36. Most drops of water adhering to the purge valve 113 are thereby blown away. In Step S38, the control unit 123 stands by until a predetermined time elapses and the purge valve 113 dries. The predetermined time is stored in the control unit 123. In order to obtain the predetermined time, the time taken until the temperature of the purge valve 113 is increased by the heater 11, and drops of water remaining in the purge valve 113 dry, is experimentally measured, and some extra time is added to the measured time.

When the predetermined time passes in Step S38, the control unit 123 performs Step S42. In Step S42, the control unit 123 closes the hydrogen pressure control valve 106, stops the hydrogen circulation pump 111, and stops the compressor 116. Then, the control unit 123 stops power supply to the heater of the purge valve 113 in Step S44, and closes the purge valve 113 in Step S46, thus completing the stop operation.

Figure 6:
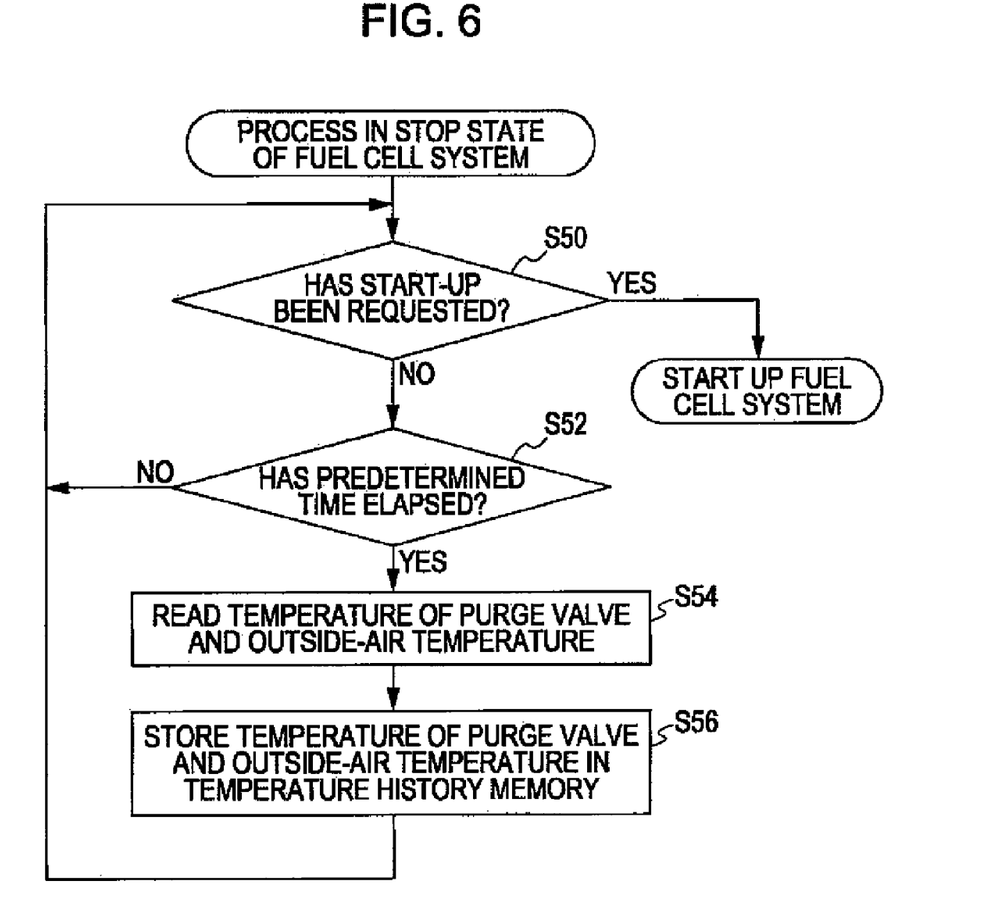
FIG. 6 is a flowchart showing control executed during a non-operation state of the fuel cell system.

FIG. 6 is a control flowchart showing the operation of the control unit 123 performed while the operation of the fuel cell system 101 is stopped. First, in Step S50, the control unit 123 determines whether there is a start-up request for the fuel cell system 101. For example, the start-up request is a signal issued when a start switch for the fuel cell system 101 is operated or when idling stop is cancelled. When there is a start-up request in Step S50, for example, the start-up operation of the fuel cell system 101 shown in FIG. 4 is performed. If there is no start-up request in Step S50, it is determined in Step S52 whether a predetermined time (temperature history measuring period, for example, five minutes) has elapsed. When it is determined in Step S52 that the predetermined time has not elapsed, Step S50 is performed again. When it is determined in Step S52 that the predetermined time has elapsed, a timer for counting the predetermined time is reset, and Step S54 is performed.

In Step S54, the control unit 123 reads the temperature of the purge valve 113 from the temperature sensor 115, and reads the outside-air temperature from the outside-air temperature sensor 121. In Step S56, the control unit 123 stores the temperature of the purge valve 113 and the outside-air temperature in the temperature history memory, and Step S50 is performed again. In this way, the temperatures of the purge valve 113 and the outside-air temperatures measured at regular time intervals during the stop time of the fuel cell system 101 can be stored in the temperature history memory, and can be used to check for freezing on start-up.

Upon start-up of the fuel cell system 101, the heater 11 is activated while the pressure in the hydrogen circulation passage 110 is increased (for example, higher than the outside pressure or the pressure in the low-pressure chamber 20) by operating the hydrogen circulation pump 111. In this case, the heater 11 is disposed on the side of the high-pressure chamber 19 (inflow passage 13). This increases the gas concentration in the space (first space) near the heater 11 and the valve element 6, and improves heat transferability. Therefore, the thawing time at the passage 32, the valve seat 33, and the valve element 6 can be reduced further.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A valve for a vehicle fuel cell system, comprising:
 a housing including an inflow passage and an outflow passage;
 a valve body disposed in the housing and including a fluid passage configured to selectively provide fluid communication between the inflow passage and the outflow passage; and
 means for directly heating the valve body, wherein a valve driving unit is disposed at a first end of the fluid passage, and the means for directly heating is disposed at a second end of the fluid passage, wherein the means for directly heating is provided below and terminates below the fluid passage in the direction of gravity such that liquid remaining in the fluid passage is collected near the means for directly heating.

2. A valve for a fluid passage in a vehicle fuel cell system, the valve comprising:
 a housing including an inflow passage connected to an upstream side of the fluid passage and an outflow passage connected to a downstream side of the fluid passage;
 a valve body disposed in the housing and including an intermediate fluid passage configured to provide fluid communication between the inflow passage and the outflow passage; and
 a heating element configured to apply heat directly to the valve body, wherein a valve driving unit is disposed at a first end of the intermediate fluid passage, and the heating element is disposed at a second end of the intermediate fluid passage, wherein the heating element is provided below and terminates below the intermediate fluid passage in the direction of gravity such that liquid remaining in the intermediate fluid passage is collected near the heating element.

3. The valve according to claim 2, wherein the second end of the intermediate fluid passage at which the heating element is disposed is lower in a direction of gravity than the first end of the intermediate fluid passage at which the valve driving unit is disposed.

4. The valve according to claim 2, wherein the heating element is disposed near the inflow passage.

5. The valve according to claim 2, wherein the valve body is thermally insulated from the housing via a member having a thermal conductivity lower than that of the valve body.

6. The valve according to claim 2, wherein the valve driving unit is biased closed in an inoperative condition.

7. The valve according to claim 2, wherein the heating element is an electrical heater.

8. The valve according to claim 2, wherein the intermediate fluid passage is connected to the inflow passage via a first space and to the outflow passage via a second space, and the outflow passage slopes downward from a lower end of the second space.

9. The valve according to claim 8, wherein the first space is a high pressure chamber and the second space is a low pressure chamber.

10. The valve according to claim 2, wherein the intermediate fluid passage is connected to the inflow passage via a first space and to the outflow passage via a second space, and the inflow passage slopes downward from a lower end of the first space.

11. The valve according to claim 10, wherein the first space is a high pressure chamber and the second space is a low pressure chamber.

12. The valve according to claim 2, wherein the heating element is directly connected to the valve body via a threaded connection.

13. The valve according to claim 12, wherein the heating element is an electrical heater.

14. A valve for a vehicle fuel cell system, comprising:
 a housing including an inflow passage and an outflow passage;
 a valve body disposed in the housing and including a fluid passage configured to selectively provide fluid communication between the inflow passage and the outflow passage; and
 a heating element in direct thermal contact with the valve body, wherein a valve driving unit is disposed at a first end of the fluid passage, and the heating element is disposed at a second end of the fluid passage, wherein the heating element is provided below and terminates below the fluid passage in the direction of gravity such that liquid remaining in the fluid passage is collected near the heating element.

15. The valve according to claim 14, wherein the heating element is an electrical heater.

16. The valve according to claim 15, wherein the heating element contacts the valve body proximate the inflow passage.

17. The valve according to claim 16, wherein the heating element is connected to the valve body via a pair of male and female threads.

* * * * *